United States Patent [19]
Jackson et al.

[11] 3,723,714
[45] Mar. 27, 1973

[54] DIGITAL PHASE TRACKER
[75] Inventors: Harold W. Jackson, Baltimore; Merlin E. Olmstead, Manchester; William E. Fickenscher, Baltimore, all of Md.
[73] Assignee: The Bendix Corporation, Southfield, Mich.
[22] Filed: Mar. 31, 1971
[21] Appl. No.: 129,720

[52] U.S. Cl. ............... 235/152, 328/55, 178/69.5 R, 179/15 BS, 307/208, 307/210, 307/232, 307/269
[51] Int. Cl. ........ H03k 5/13, H03k 19/00, H04j 3/06
[58] Field of Search ........328/55; 307/210, 232, 269, 307/208; 235/152; 178/69.5 R; 179/15 BS

[56] References Cited
UNITED STATES PATENTS

| | | | |
|---|---|---|---|
| 3,209,265 | 9/1965 | Baker et al. | 328/55 X |
| 3,271,688 | 9/1966 | Gschwind et al. | 307/269 X |
| 3,218,560 | 11/1965 | Peters | 307/269 X |
| 3,493,679 | 2/1970 | Chomicki | 178/69.5 R |
| 3,544,717 | 12/1970 | Smith | 178/69.5 R |
| 3,448,402 | 6/1969 | Booker et al. | 307/232 X |
| 3,263,174 | 7/1966 | Bjorkman et al. | 328/55 X |
| 3,142,802 | 7/1964 | Maure | 328/55 |

Primary Examiner—Malcolm A. Morrison
Assistant Examiner—James F. Gottman
Attorney—Plante, Hartz, Smith & Thompson, Bruce L. Lamb and William G. Christoforo

[57] ABSTRACT

A digital phase tracker includes a memory for storing a signal locked in phase with an external signal and means for maintaining the signal stored within the memory phase synchronized with the external signal as the phase of the external signal varies. The time relationship between positive excursions of the external signal and positive excursions of the stored signal is timed by high-speed clock pulses with clock pulses being added to or subtracted from the memory signal to maintain phase-lock.

13 Claims, 2 Drawing Figures

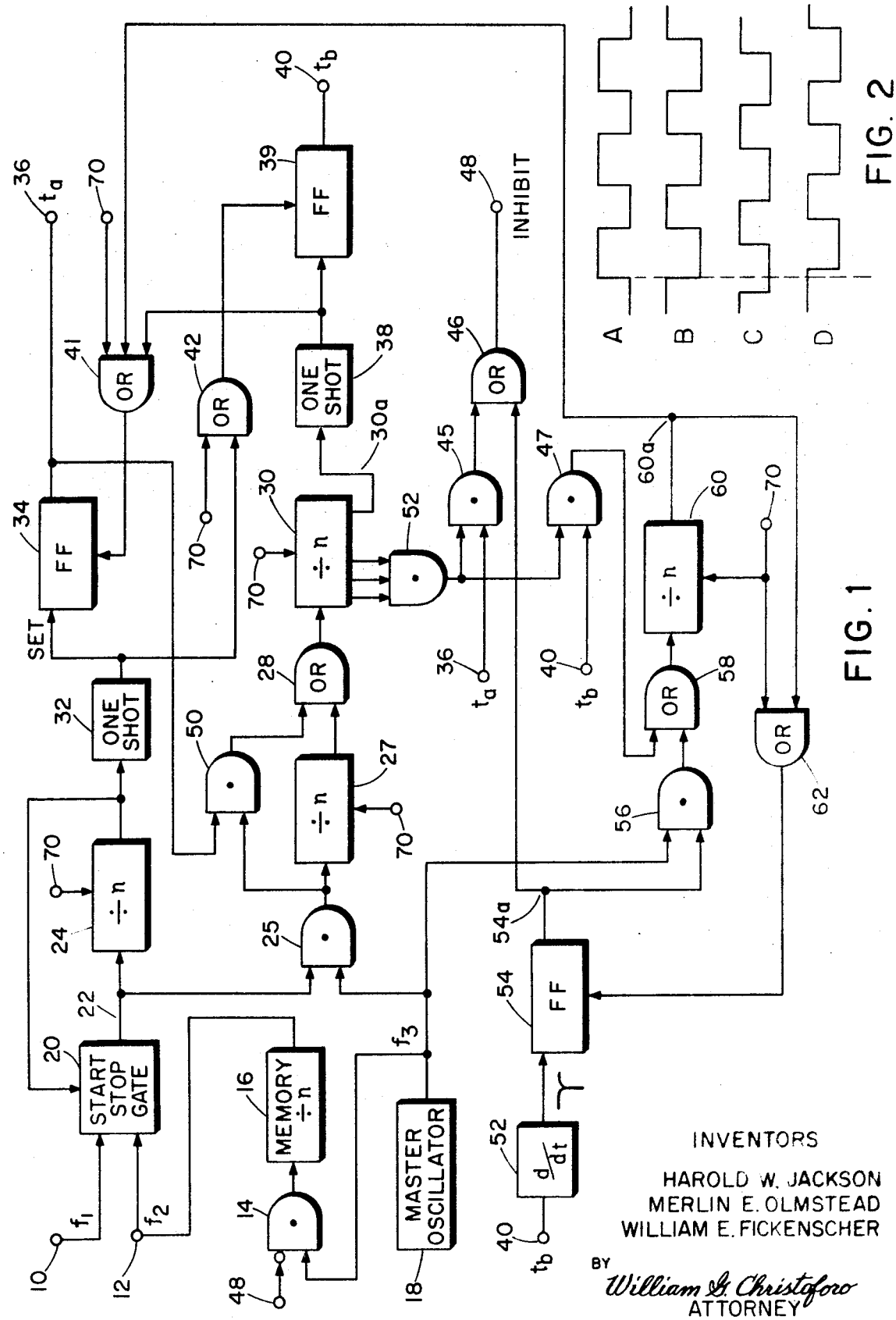

DIGITAL PHASE TRACKER

BACKGROUND OF THE INVENTION

This invention relates to phase trackers and more particularly to phase trackers which utilize digital circuitry and which are particularly adapted for use in noisy environments.

In some operations it is important that the phase of a signal be determined. In a further sub-group of these operations it is more important that continuity of phase be maintained even though continuity of signal cannot be maintained or is not essential. These sub-groups occur where the phase of the signal varies relatively slowly and may thus be memorized and occasionally up-dated by the actual signal phase. It is an object of this invention to prOvide a phase tracker which will memorize a second signal in phase lock with a first signal whose phase is varying.

In certain navigation systems, such as the Omega navigation system, a plurality of fixed stations generate signals which are received by an ordinarily moving receiver, for example, a receiver located in a ship. The location of the ship can be determined by considering the phase relation of the signals with one another. As the ship and hence the receiver move, the phase of the signals received from the fixed stations with respect to one another changes slowly. It is another Object of this invention to provide a phase tacker particularly adapted to be used in a navigation receiver for tracking the phase of signals received from fixed stations.

It is a further object of this invention to provide a phase tracker which may be assembled from digital components.

It is the further object of this invention to provide a digital phase tracker of the type described which can be used in noisy environments.

These and other objects of the invention will become apparent in the following description of preferred embodiment and appended claims.

SUMMARY OF THE INVENTION

To accomplish the above objects of invention, a memory is provided which generates a signal of the same frequency as an input signal to which the memory signal is to be phase locked. The time between conveniently recognizable points on each of these signals, for example, positive-going excursions of the signals, is determined, suitably by counting the number of clock pulses generated by a master oscillator during this time. If the memorized signal is leading phase lock, a number of clock pulses proportional to the number of counted clock pulses are applied directly to the memory to delay the memorized signal toward phase lock. If the memorized signal is lagging phase lock, the number of clock pulses applied to the memory is equal to the number of clock pulses required to delay the memorized signal by 360° less a number of clock pulses proportional to the number of counted clock pulses. This, in essence, is identical to advancing the phase of the memorized signal by a time proportional to the number of counted clock pulses.

The digital phase tracker to be described below includes a memory in the form of a digital counter which counts down clock pulses from the master oscillator. The master oscillator frequency and the number of memOry stages is designed to be such that the frequency at the output of the memory is equal to the frequency of the signal to which the memory frequency is to be phase-locked, that is, the input signal frequency. The number of master oscillator clock pulses occurring between positive excursions of the input signal and positive excursions of the memorized signal are recorded in a counter means. The number of such pulses recorded must be maintained at a predetermined constant value in order to assure the proper phase relationship between the received signal and the memory signal. When the number of lock pulses between positive excursions of the input and memorized signals are not equal to the predetermined number, the number of pulses required to bring this number to the predetermined number is determined. A percentage of this number of clock pulses are blocked from the memory to thus move the memory signal toward phase lock with the received signal if the memory signal is leading the input signal, or a 360° shift of memorized signal less a percentage of the determined phase errOr is performed on the memorized signal where that signal lags the input signal.

BRIEF DESCRIPTION OF THE DRAWINGS

FIG. 1 is a block diagram of the invention.

FIGS. 2A, 2B, 2C and 2D are waveforms drawn to a common time base where:

FIG. 2A represents the waveform of the input signal;

FIG. 2B represents the waveform of the memorized signal when phase-locked with the input signal;

FIG. 2C represents the waveform of the memorized signal when in leading phase-lock with respect to the signal of FIG. 2A; and FIG. 2D represents the waveform of the memorized signal when in lagging phase-lock with respect to the signal of FIG. 2A.

DESCRIPTION OF THE PREFERRED EMBODIMENT

Referring first to FIG. 1 an input signal of frequency $f_1$ is received at terminal 10 from an external sOurce not shown. A signal of frequency $f_2$ is received at terminal 12 from a memory 16. A third signal of frequency $f_3$ in the form of clock pulses is generated by master oscillator clock 18.

In this embodiment $$f_1 = f_2 = f_3/n.$$

In addition, phase lock is defined as the condition where the phase of the signal $f_2$ lags signal $f_1$ by 180°. Signal $f_1$ is shown in FIG. 2A, while signal $f_2$ properly phase-locked therewith, is seen in FIG. 2B. The reason why phase-lock is taken when the signals are 180° phase separated will be made apparent below.

Returning now to FIG. 1, positive-going excursions of signal $f_1$ are applied to the start-stop gate 20, suitably a flip-flop, which in accordance therewith generates an output along line 22. Positive-going excursions of signal $f_2$ are applied to gate 20 to extinguish the signal on line 22. The signals on line 22 are counted by a divide-by-$n$ counter 24, where n is equal to $f_3/f_1$. The signal on line 22 is also applied to qualify And gate 25 which thus allows signal $f_3$ to pass therethrough to another divide-byn counter 27. Counter 27 generates an output every nth cycle of signal $f_3$, with this output being applied through Or gate 28 to a third divide-by-n counter 30.

Aforementioned counter 24 generates an output pulse every nth cycle of signal $f_1$, which output pulse triggers one-shot 32 to generate a standardized pulse which is applied to the set terminal of flip-flop 34 to trigger that flip-flop to generate at terminal 36 a signal identified as $t_a$. Terminal 36 is also seen as one input to And gate 45, the line joining the common terminals being omitted for clarity.

Assuming that counter 30 is a digital counter and comprised of a series of flip-flops and additionally is set to zero when empty, the flip-flop that registers its most significant bit will go to the logical "1" state when the counter is half full. When this occurs a signal is applied from the aforementioned most significant bit flip-flop via line 30a to trigger one-shot 38 which thereby generates a standardized output pulse which is used to set flip-flop 39 to thus energize terminal 40 with signal $t_b$. Terminal 40 is also seen as an input to And gate 47. It will also be noted that the output pulse from one-shot 38 is applied via Or gate 41 to reset flip-flop 34 to thus eliminate the $t_a$ signal at terminal 36. Additionally, the output pulse from one-shot 32 is applied through Or gate 42 to reset flip-flop 39 to extinguish the $t_b$ signal at terminal 40.

In analyzing the operation of the device insofar as it has already been described it will be noted that counter 24, in essence, counts the cycles of signal $f_1$ while counters 27 and 30 count the number of clock pulses $f_3$ which occur between successive positive excursions of signals $f_1$ and $f_2$. Remembering that $f_1 = f_2 = f_3/n$, it can be seen that the output from counter 24 is $f_1/n$, which is equal to $f_2/n$. The output from counter 27 is $f_3/n$, which is equal to $f_1$, assuming the signals are phase-locked. Considering the counting means comprised of counters 27 and 30 and also remembering that at phase lock the signal $f_2$ lags signal $f_1$ by a phase angle of 180°, that if the signals are phase-locked after $n$ cycles of $f_1$, counter 30, assuming it started at the zero condition will be half full. In other words, the flip-flop corresponding to the most significant digit of that counter will generate an output on line 30a at the same time counter 24 generates an output if signal $f_2$ is phase-locked with signal $f_1$. Conversely, if counter 24 fills before the output signal appears on line 30a it indicates that signal $f_2$ is less than 180° lagging from signal $f_1$, that is, signal $f_2$ is leading phase lock. On the other hand, if the signal occurs at line 30a before counter 24 is full it indicates the signal $f_2$ lags signal $f_1$ by greater than 180° or is lagging phase lock. Of course, signal $t_a$ appears at terminal 36 upon counter 24 becoming filled, while signal $t_b$ is generated at terminal 40 upon line 30a becoming energized.

It is the purpose of the remaining elements of the circuit of FIG. 1 to determine which of the signals, $t_a$ or $t_b$, occurs first and the time of separation between the occurrence of these signals, and to develop an error signal from this time which can be applied to memory 16 to bring signal $f_2$ into phase lock, as defined, with signal $f_1$.

Upon counter 24 becoming full, in addition to its causing signal $t_a$ to be generated at terminal 36, it also applies a feedback signal to gate 20 which opens that gate so that it is no longer controlled by signals $f_1$ and $f_2$ and additionally causes it to continue to generate an output on line 22 so long as counter 24 remains full. This means that signals are no longer entered into counter 24 but, however, And gate 25 remains qualified so that the clock pulses from signal $f_3$ can continue to be passed therethrough. The signal $t_a$ at terminal 36 iS also applied to qualify And gate 50 so that the clock pulses passing through gate 25 are now shunted around counter 27 and through qualified gate 50 and Or gate 28 directly into counter 30.

Selected flip-flop stages of counter 30 are tapped and connected to the inputs of AND gate 52. It will be made obvious as this description proceeds that the number of stages tapped determines what percentage of the error signal will be applied to memory 16 in bringing signal $f_2$ into phase lock with signal $f_1$. In the embodiment shown the first three stages of the counter are tapped. Hence, And gate 52 will become qualified for each eighth cock pulse entering the counter. The output from And gate 52 is applied as an input to both And gates 45 and 47. The output signal from gate 45 is applied through Or gate 46 to energize terminal 48, the signal now appearing at this terminal being termed an "inhibit" signal.

Terminal 40 is also seen as an input to the differentiating circuit 52, this terminal 40 being identical to the terminal 40 at the output of flip-flop 39 and at the input of And gate 47. Differentiating circuit 52 generates a spike at the trailing edge of signal $t_b$, which trailing edge indicates the time at which signal $t_b$ is extinguished. This spike is applied to set flip-flop 54 which thereby generates a signal on line 54a to qualify And gate 56. This signal at line 54a also passes through Or gate 46 to generate an "inhibit" signal on terminal 48. With And gate 56 thus qualified the clock pulses from master oscillator 18 can pass therethrough and through Or gate 58 to divide-by-n counter 60. When this counter fills, a signal is applied along line 60a and through Or gate 62 to reset flip-flop 54 thus closing gate 56.

The operation of this embodiment of the invention is as follows. To begin a cycle of the phase tracker a reset pulse is applied at terminal 70, which are the reset terminals of counters 24, 27, 30 and 60 and which are additionally connected through Or gates 41, 42 and 62 to reset respectively flip-flops 34, 39 and 54. With counter 24 clear, the feedback signal applied to gate 20 is extinguished thereby extinguishing the signal on line 22 to prepare the gate for normal operation. The next positive excursion at terminal 10 From Signal $f_1$ opens the gate so that a signal appears at line 22, this signal being counted by counter 24 and also being applied to qualify And gate 25. While thus qualified the clock pulses of signal $f_3$ pass through gate 25 to be accumulated in counter 27. A subsequent positive excursion at terminal 12 from signal $f_2$ closes gate 22 thus extinguishing the signal on line 22 and closing gate 25. Further cycles of signals $f_1$ and $f_2$ continue to operate gate 20 in the manner just described until counter 24 fills after $n$ cycles of signal $f_1$ to thereby open gate 20 in the manner previously described. If counter 24 fills at the same time a signal is generated on line 30a, thus indicating that signal $f_2$ is phase-locked with signal $f_1$, one-shots 32 and 38 are triggered simultaneously with their output pulses being applied through Or gates 42 and 41 to respectively hold flip-flops 39 and 34 in the reset condition. Thus, neither signal $t_a$ nor $t_b$ will be generated and no correction will be made to signal $f_2$ in memory 16, as should be obvious as this description prOceeds.

Assume, now, that signal $t_a$ is generated before signal $t_b$. In this case gate 50 is qualified and the clock pulses of signal $f_3$ pass directly therethrough and through Or gate 28 into counter 30. Since counter 30, prior to this time, contained the average number of pulses entered into the counting means coMprised of counters 27 and 30 at each opening of gate 20 and since signal $t_a$ is generated first thus indicating that counter 30 does not contain the required number, $n/2$, of clock pulses, the clock pulses now entering the counter through gates 50 and 28 will continue to count this counter down until it contains $n/2$ counts, at which time line 30a is energized to trigger one-shot 38 to reset flip-flop 34 through Or gate 41 to thus extinguish the $t_a$ signal. During the time that the $t_a$ signal is being generated by flip-flop 34, gate 45 is opened, while gate 47 is closed so that every eighth pulse entered into counter 30 after signal $t_a$ is generated and before signal $t_b$ is generated will pass through gate 45 and Or gate 46 to generate an "inhibit" signal at terminal 48. This "inhibit" signal closes gate 14 during the period of the clock pulse passed through gate 52, thus retarding the signal in memory 16 by the amount of one clock pulse for each eight clock pulses required to produce an output on line 30a. Of course, the output at line 30a causes the $t_b$ signal to be generated and to reset flip-flop 34 thereby extinguishing the $t_a$ signal, closing gate 45 and extinguishing the "Inhibit" signal at terminal 48.

A greater or lesser percentage of the clock pulses entering counter 30 after the $t_a$ signal has been generated can be used to correct the phase of the $f_2$ signal in memory 16 by simply using more or fewer counter 13 flip-flop taps to control gate 52. For example, if only a single tap were used all clock pulses would be used to correct the memory. However, where the signal $f_1$ is noisy it could be expected that over-correction would occur in this case and the reliability of actually attaining a phase lock would be quite small.

Assume now that the signal $t_b$ is generated first indicating that the phase of signal $f_2$ is lagging phase lock with signal $f_1$. In this case, And gate 47 is qualified while And gate 45 remains closed, and every eighth pulse entering counter 30 is applied through And gate 52, by the mechanism previously described, and thence through qualified gate 47 and Or gate 58 into counter 60. When a $t_a$ signal is subsequently generated the $t_b$ signal is extinguished and the trailing edge of that signal is differentiated by differentiating circuit 52 and applied to set flip-flop 54 to thereby energize line 54a. The signal at line 54a passes through Or gate 46 to terminal 48 to inhibit gate 14 to thus prevent clock pulses from reaching memory 16. Additionally, gate 56 is qualified whereby clock pulses pass therethrough and through Or gate 58 and enter counter 60 which, it will be remembered, has already accumulated one-eighth of the clock pulses occurring between signal $t_b$ and $t_a$. Counter 60 now accumulates the number of clock pulses equal to $n$ minus one-eighth of the clock pulses occurring between signals $t_b$ and $t_a$, at which time it generates an output on line 60a which is applied through Or gate 62 to reset flip-flop 54 thus extinguishing the "inhibit" signal. In this manner the $f_2$ signal in memory 16 has been actually delayed by the number of clock pulses required to fill counter 60 which, in effect, is the same as advancing the phase of the $f_2$ signal by a predetermined percentage of the actual phase lock error. The output signal from counter 60 is also applied through Or gate 41 to reset flip-flop 34 to thus extinguish the $t_a$ signal to insure that gate 45 closes when flip-flop 54 is reset.

Actual use of the invention as made in a phase tracker used in an Omega navigation system receiver. In that use, the signal $f_1$ was the receiver intermediate frequency and was 1.275 kHz. $n$ was equal to 1,024; hence, the divide-by-$n$ counters of the embodiment consisted of ten flip-flop stages. Clock frequency $f_3$ was, of course, equal to $nf_1$ and was thus 1.3056 MHz.

The invention claimed is:

1. Means for maintaining a fIrst signal phase locked to a second signal, said first and second signals having first and second predetermined points respectively, comprising:
   a source of clock pulses;
   a digital counter counting said clock pulses for generating said first signal;
   gate means enabled by one of said predetermined points and disabled by the other of said predetermined points for generating an output signal when enabled;
   second means for counting the number of times said gate means is enabled;
   third means for counting clock pulses applied thereto;
   means responsive to said output signal for applying said clock pulses to said third means;
   means for obtaining the quotient of the count contained in said third means by the count contained in said second means whereby the average number of clock pulses occurring between one said predetermined point and the other said predetermined point is obtained; and,
   means for blocking clock pulses from being counted by said digital counter in response to said average number of clock pulses.

2. Means for maintaining a first signal in phase lock with a second signal, wherein said first and second signals are at the same frequency, comprising:
   means for generating clock pulses at a pulse repetition frequency which is a whole integer ($n$) multiple of said same frequency;
   gate means enabled by a predetermined point on one of said first or second signals and disabled by a predetermined point on the other of said first or second signals;
   a first divide-by-$n$ counter means for counting the number of enable-disable cycles of said gate means and for generating a first output signal upon counting $n$ cycles;
   a second divide-by-$n^2$ counter means for counting the number of clock pulses occurring during $n$ cycles of said gate means while said gate means is enabled, and for generating a second output signal when a predetermined number of clock pulses have been counted;
   memory means for storing and generating said first signal; and, logic means for determining the number of clock pulses generated between said first output signal and said second output signal and for varying the phase of said first signal in accordance with the number of clock pulses so determined.

3. Means as recited in claim 2 wherein said memory means comprises a third divide-by-$n$ counter which is counted down by said clock pulses applied thereto to generate said first signal.

4. Means as recited in claim 3 wherein said logic means includes means for applying said clock pulses to said memory means, said applying means being inhibited in response to said determined number of clock pulses whereby the phase of said first signal is varied.

5. Means as recited in claim 3 wherein all said recited counters are digital counters.

6. Means as recited in claim 5 wherein said digital counters each consist of a plurality of flip-flop stages.

7. Means as recited in claim 5 wherein said second counter includes two divide-by-$n$ counters serially connected whereby the second of said counters counts the number of times the first of said counters counts $n$ clock pulses.

8. Means as recited in claim 7 wherein the second of said counters generates said second output signal when it attains a predetermined count.

9. Means as recited in claim 8 wherein said predetermined count is the number of clock pulses generated between said predetermined points on said first and second signals when said first and second signal are in phase lock.

10. Means as recited in claim 2 wherein said logic means comprises means for determining which of said first and second output signals occurs first and the number of clock pulses generated between said first generated of said first and second output signals and the second generated of said first and second output signals, and for varying the phase of said first signal in accordance with the number of clock pulses so determined and in a direction related to which of said first and second output signals occurred first.

11. Means for maintaining a memorized signal in phase lock with an input signal, wherein said memorized and input signals are at the same frequency, comprising:
a source of clock pulses at a pulse repetition freQuency which is a whole integer ($n$) multiple of said same frequency;
memory means responsive to said clock pulses for generating said memorized signal;
gate means enabled by a first predetermined point on one of said memorized or input signals and disabled by a second predetermined point on the other of said memorized or input signals for generating a gate output signal while enabled;
a first divide-by-$n$ counter means for counting the number of gate output signals generated and for generating a first output signal upon counting $n$ gate output signals;
a second divide-by-$n^2$ counter means for counting the total number of clock pulses, in groups of $n$ clock pulses each, which are generated while said gate means is enabled, and for generating a second output signal upon attaining a predetermined count;
means for determining the number of clock pulses occurring between said first and second output signals, regardless of which occurs first; and,
means for varying the phase of the signal stored and generated by said memory means in a first direction when one of said first and second output Signals occurs first and for varying the phase of the signal stored and generated by said memory means in the other direction when the other of said first and second output signals occurs first.

12. Means as recited in claim 11 wherein said divide-by-$n^2$ counter means comprises third and fourth divide-by-$n$ counters, said third counter counting the total number of clock pulses occurring while said gate means is enabled and said fourth counter counting the number of times said third counter fills.

13. Means as recited in claim 12 wherein phase lock of said memorized and input signals occurs when said gate means is enabled just long enough during an average length enabled period to permit $n/2$ clock pulses to be counted by said second counter means, said second output signal being generated when said fourth counter has attained an $n/2$ count.

* * * * *